United States Patent
Ikegami et al.

(10) Patent No.: US 11,734,083 B1
(45) Date of Patent: *Aug. 22, 2023

(54) SYSTEMS AND METHODS FOR INTER-PARTITION COMMUNICATION

(71) Applicant: NORTHROP GRUMMAN SYSTEMS CORPORATION, Falls Church, VA (US)

(72) Inventors: Michael C. Ikegami, Palm Bay, FL (US); Stephen P. Palecek, Melbourne, FL (US); Daniel Moore, Rockledge, FL (US); Drew Butikofer, West Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/381,764

(22) Filed: Jul. 21, 2021

Related U.S. Application Data

(63) Continuation of application No. 16/458,978, filed on Jul. 1, 2019, now Pat. No. 11,099,911.

(51) Int. Cl.
  *G06F 9/54* (2006.01)
  *G06F 9/455* (2018.01)
  *G06F 9/50* (2006.01)

(52) U.S. Cl.
  CPC ........ *G06F 9/5077* (2013.01); *G06F 9/45558* (2013.01); *G06F 9/541* (2013.01);
  (Continued)

(58) Field of Classification Search
  CPC .... G06F 9/5077; G06F 9/45558; G06F 9/541; G06F 9/547; G06F 9/545; G06F 9/546; G06F 2009/45583; G06F 2009/45595
  See application file for complete search history.

(56) References Cited

U.S. PATENT DOCUMENTS

| 8,505,029 B1 * | 8/2013 | Chanda ............... G06F 9/547 718/1 |
| 11,099,911 B1 * | 8/2021 | Ikegami ............... G06F 9/546 |
| 2007/0143315 A1 | 6/2007 | Stone |
| 2010/0217916 A1 | 8/2010 | Gao et al. |

(Continued)

OTHER PUBLICATIONS

Riedlinger et al.: "An Adaptive Self-Managing Platform for Cabin Management Systems"; CEAS Aeronaut J 7, 483-498 (2016). https://doi.org/10.1007/s13272-016-0205-4.

*Primary Examiner* — Brian W Wathen
(74) *Attorney, Agent, or Firm* — Tarolli, Sundheim, Covell & Tummino LLP

(57) ABSTRACT

In an example, a method can include determining, at a first inter-partition messenger, a message type for a message generated by a first application. The first inter-partition messenger and the first application can reside on a first virtual machine. The method can include identifying, at the first inter-partition messenger, a second application that is to receive the message based on the message type and message subscription data, generating, at the first inter-partition messenger, message routing data for routing of the message from the first virtual machine to the second virtual machine, causing, at the first inter-partition messenger, the message to be routed from the first virtual machine to the second virtual machine based on the message routing data, and receiving, at the second inter-partition messenger, the message for use thereof by the second application. The second inter-partition messenger and the second application can reside on the second virtual machine.

20 Claims, 9 Drawing Sheets

(52) U.S. Cl.
CPC .............. *G06F 9/545* (2013.01); *G06F 9/546* (2013.01); *G06F 2009/45583* (2013.01); *G06F 2009/45595* (2013.01)

(56) References Cited

U.S. PATENT DOCUMENTS

| | | |
|---|---|---|
| 2011/0066782 A1 | 3/2011 | Oshins et al. |
| 2012/0005691 A1 | 1/2012 | Wong et al. |
| 2013/0232491 A1 | 9/2013 | Radhakrishnan et al. |
| 2017/0003995 A1* | 1/2017 | Hu ..................... G06F 9/45558 |
| 2017/0123835 A1 | 5/2017 | Mizuno et al. |
| 2017/0187694 A1 | 6/2017 | Friedman et al. |
| 2018/0232315 A1 | 8/2018 | Wibling et al. |
| 2019/0013963 A1 | 1/2019 | Papo et al. |
| 2019/0124050 A1 | 4/2019 | Scheffer et al. |
| 2020/0028946 A1 | 1/2020 | Vora et al. |
| 2020/0218560 A1 | 7/2020 | Lin et al. |

* cited by examiner

```
template<typename MsgType>
class Transport{
public:
   init(bool isSubscriber, bool isPublisher, char* xmlFile)
   send(MsgType& msg)
   popOrTimeout(MsgType &msg, unsigned int timeoutMs)
};
```

```
<transport>
  <topic>HelloWorld</topic>
  <bus_id>BUS_1</bus_id>
  <!-- 0xFF if message is to be distributed to all partitions -->
  <dest_partition>0xFF</dest_partition>
</transport>
```

```
class MMSRouter{
public:

/**
     * Register a buffer that Router will pull messages from and transmit them.
     * @param transmitBuffer A transmit buffer MMSRouter should begin pulling message from to transmit.
     * @param (out) transporterID the unique ID assigned to this transporter by the router.
     * @return True if the buffer is registered correctly. False otherwise.
     */
    static bool registerTransmitBuffer(mmsBuffer* transmitBuffer, uint16& transporterID);

/**
     * Register a buffer that Router will place new messages in.
     * @param receiveBuffer A receive buffer MMSRouter should send messages to for a specific topic ID.
     * @param (out) topicID the topic ID that this receive buffer wants to receive messages from.
     * @return True if the buffer is registered correctly. False otherwise.
     */
    static bool registerReceiveBuffer(mmsBuffer* receiveBuffer, uint16 topicID);
}
```

FIG. 7

“SYSTEMS AND METHODS FOR INTER-PARTITION COMMUNICATION

RELATED APPLICATION

This application is a continuation of U.S. Non-provisional patent application Ser. No. 16/458978, filed 1 Jul. 2019, entitled "SYSTEMS AND METHODS FOR INTER-PARTITION COMMUNICATION," which is incorporated herein by reference in its entirety.

TECHNICAL FIELD

The present disclosure relates to inter-partition communication. More specifically, the present disclosure relates to systems and methods for communicating application messages between partitioned systems.

BACKGROUND

Partitioned systems are typically used to meet stringent safety and mission critical requirements in modern avionic systems such as integrated modular avionic (IMA) systems. Aeronautical Radio Inc. (ARINC) has promulgated the "ARINC Specification 653: Avionics Application Standard Software Interface" family of specifications (generally referred to here as "ARINC 653") to host multiple applications at different levels of abstraction on similar hardware. ARINC 653 "Avionics application software standard interface" defines an Application Program Interface (API) referred to as an Application Executive (APEX) that can be implemented in Real-Time Operating Systems (RTOS) and used for avionic control systems. ARINC 653 allows for space and time partitioning that may be used wherever multiple applications need to share resources, in order to guarantee that one application cannot bring down another in the event of application failure.

SUMMARY

In an example, a method for communicating application messages between partitioned systems can include determining, by one or more hardware processors, at a first inter-partition messenger, a message type for a message generated by a first application based on message type data. The first inter-partition messenger and the first application can reside on a first virtual machine. The method can further include identifying, by the one or more hardware processors, at the first inter-partition messenger, a second application that is to receive the message based on the message type and message subscription data. The method can further include generating, by the one or more hardware processors, at the first inter-partition messenger, message routing data for routing of the message from the first virtual machine to the second virtual machine in response to identifying the second application. The method can further include causing, by the one or more hardware processors, at the first inter-partition messenger, to route the message from the first virtual machine to the second virtual machine based on the message routing data. The method can further include receiving, by the one or more hardware processors, at a second inter-partition messenger, the message for user thereof by the second application. The second inter-partition messenger and the second application can reside on the second virtual machine.

In another example, a system can include memory to store machine readable instructions and one or more hardware processors to access the memory and execute the machine readable instructions. The machine readable instructions can cause the one or more hardware processors to provide a plurality of virtual machines. A given virtual machine of the plurality of virtual machines can include an inter-partition messenger that include a message receiver and a message router. The message receiver can be programmed to determine a message type for a message generated by a given application residing on the given virtual machine, identify another application for receiving of the message residing on another virtual machine of the plurality of virtual machines based on the message type associated with the message and message subscription data, append routing data as header data to the message and store the message in a message outbound buffer in response to identifying the other application. The message router can be programmed to retrieve the message stored in the message outbound buffer and provide the message to a virtual machine manager (VMM) for routing of the message from the given virtual machine to the other virtual machine for use thereof by the other application.

BRIEF DESCRIPTION OF THE DRAWINGS

FIG. 7 illustrates an example of application program interface (API) code.

DETAILED DESCRIPTION

Figure 1:
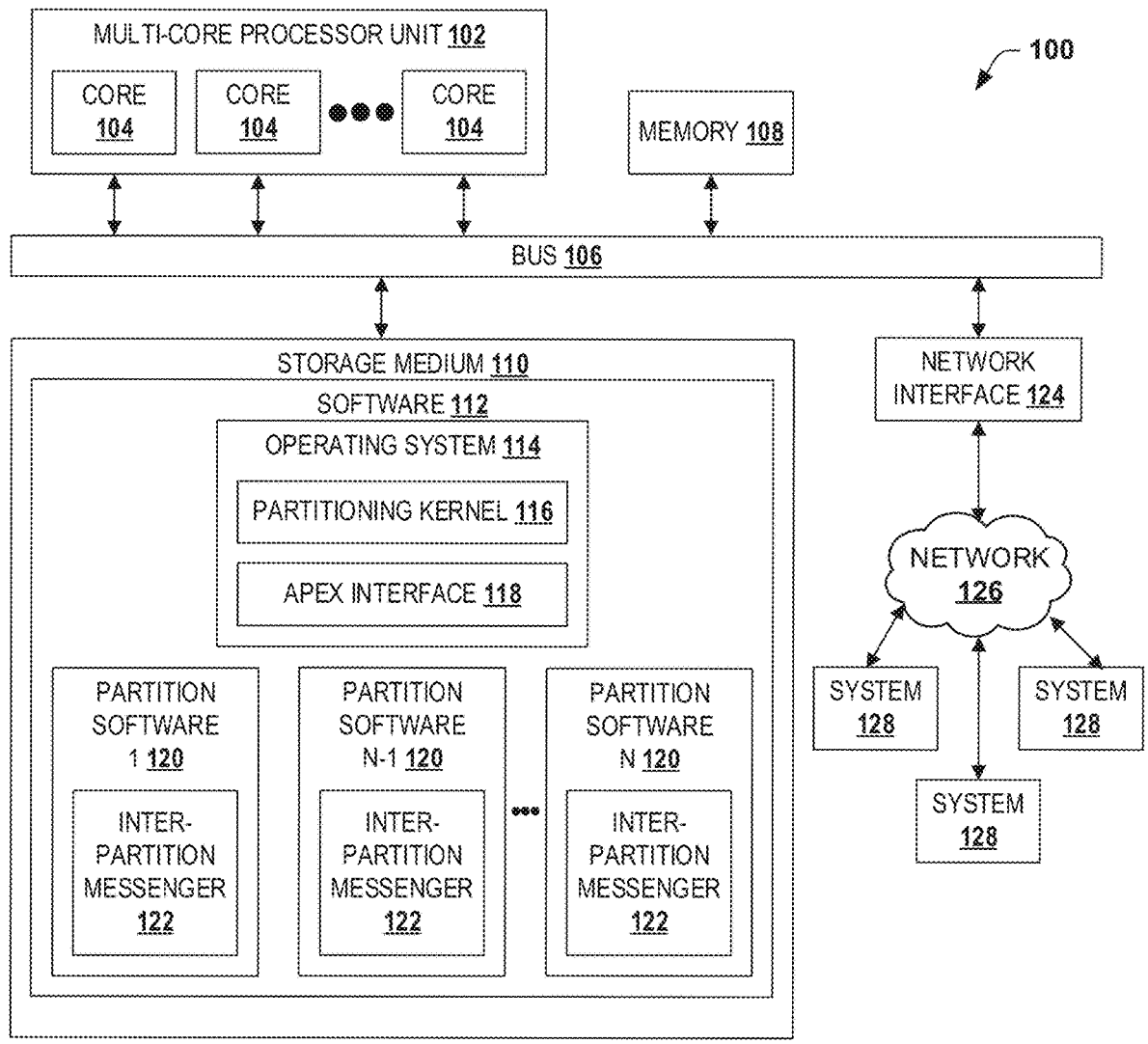
FIG. 1 illustrates an example of a system with a multi-partition architecture for communicating application messages between partitioned systems.

The present disclosure relates to systems and methods for communicating application messages between partitioned systems. In some examples, an inter-partition messaging system can be programmed to allow for inter-partition communication of messages (e.g., application data) between applications residing in partitioned systems. The distribution of messages between the applications and thereby the partitioned systems can adhere to a defined protocol, for example, as defined by an Aeronautical Radio Inc. (ARINC) 653 standard. Thus, the systems and methods herein can allow for real-time communication of safety-critical information (e.g., messages) according to a distributed publish-subscribe paradigm between multiple partitioned systems while ensuring that software applications residing in each partition meet defined safety critical software standards. The inter-partition messaging system can distribute messages to one or more applications local to the given application (e.g., the message originating application) and one or more applications located in different partitions.

By way of example, the inter-partition messaging system can include a plurality of inter-partition messengers. Each inter-partition messenger can reside in a respective partition space (e.g., on a virtual machine). For example, a first inter-partition messenger of the plurality of inter-partition messengers can reside in a same partition space as a first application (e.g., an avionics software application) on a first virtual machine. During run-time (e.g., after partition software has been compiled), the first inter-partition messenger can be programmed to receive a message from the first application for one or more applications residing in the partition space as the first application and/or one or more applications residing in a different partition space (e.g., on a second virtual machine).

The first inter-partition messenger can be programmed to employ message subscription data to identify one or more applications that have been registered (e.g., subscribed) to receive the message. In response to determining that the one or more registered applications is local to the first application, the first inter-partition messenger can be programmed to provide the message to the one or more locally registered applications. Additionally or alternatively, in response to determining that the one or more registered applications is located in a different partition space (e.g., residing on one or more other virtual machines), the first inter-partition messenger can be programmed to communicate with a virtual machine manager (VMM) to route the message to the second virtual machine based on routing data. The first inter-partition messenger can be programmed to append the routing data as header data to the message prior to communicating with the VMM for routing of the message to the second virtual machine.

A second inter-partition messenger of the plurality of inter-partition messengers residing in a similar partition space as the one or more registered applications can be programmed to evaluate the header data appended to the message to identify each registered application that is to receive message on the second virtual machine. In response to identifying each registered application, the second inter-partition messenger can be programmed to make the message available for retrieval by each registered application. Each identified application can be programmed to retrieve a corresponding message from the second inter-partition messenger. Accordingly, the inter-partition messaging system can distribute application-generated messages to applications residing in a local partition space and/or residing in different partition spaces (e.g., non-local partition spaces).

FIG. 1 illustrates an example of a system 100 with a multi-partition architecture for communicating application messages between partitioned systems. In some examples, the system 100 can be utilized to implement an integrated modular avionics (IMA) system, however, in other examples, the system 100 can be utilized to implement different systems. Thus, in some examples, the system 100 can be suitable for use in (e.g., a commercial or a military) avionics industry as an IMA system. The system 100 can be configured to create a plurality of virtual machines. Each virtual machine can be programmed to provide a software environment for implementing one or more applications for an aircraft system (e.g., an avionic system), in some examples, pursuant to a defined standard (e.g., an Aeronautical Radio Inc. (ARINC) 653 standard). Exemplary avionic systems can include, but not limited to, flight control, landing instruments, display control, data control, navigation and collision avoidance. As such, in some examples, the system 100 can allow for communication of ARINC data in an ARINC 653 network.

The system 100 can include a multi-core processor unit 102. The multi-core processor unit 102 can include a plurality of processor cores 104, illustrated in FIG. 1 respectively as "CORE." Each processor core 104 can execute program instructions for a respective process or thread. As such, each processor core 104 can execute software. Although the system 100 is implemented with multiple processor cores 104, in other examples, the system 100 can be implemented with a single processor core 104. Each of the cores 104 are coupled via a bus 106 to local memory 108. The local memory 108 can be representative of volatile memory, such as random-access memory (RAM) (e.g., dynamic and static RAM devices) or read-only memory (ROM).

Each of the cores 104 can be coupled via the bus 106 to a storage medium 110. The storage medium 110 can be representative of a non-volatile data storage, such as a hard disk drive, a solid-state drive, flash memory, etc. Software 112 can be stored on or in the storage medium 110. Although software 112 is illustrated in FIG. 1 as being stored on or in the storage medium 110, in other examples, at least a portion of the software 112 (and/or corresponding portions of the storage medium 110) can be in or form part of the local memory 108. The software 112 can be representative of programs instructions that can be read and executed by the multi-core processor unit 102. The programs instructions when executed by the multi-core processor unit 102 can carry out at least a portion of the functionality described herein as being performed by the system 100.

The software 112 can include an operating system 114 that includes a partitioning kernel 116. The partitioning kernel 116 can implement standard kernel functionality to manage access to resources (e.g., each processor core 104, the storage medium 110, the local memory 108, and input/output devices, such as a network interface 124) and allow other software to run and utilize these resources. The partitioning kernel 116 can further implement partitioning functions for the operating system 114 and thus carry out space and time partitioning (e.g., as defined by the ARINC 653 standard). The operating system 114 can include an application executive (APEX) interface 118. In some examples, the APEX interface 118 can be implemented to support the ARINC 653 standard. The APEX interface 118 can provide an interface between the partitioning kernel 116 (and the resources accessible there through) and N number of partition software 120, where N is an integer greater than two. Each partition software 120 can include an inter-partition messenger 122 and can be executed in a respective partition space (e.g., on a virtual machine), which can be provided by the partitioning kernel 116. In some examples, the partitioning kernel 116 and the APEX interface 118 can be implemented in a manner that can be certified to an appropriate certification level (e.g., such as Level A or a different level), for example, as defined by the Radio Technical Commission for Aeronautics (RTCA).

The system 100 can include a network interface 124. The network interface 124 can be employed by each processor core 104 to communicate via the bus 106 over a network 126 with other systems 128. In some examples, the network 126 is an avionics system LAN (ASL) network. The network interface 124 can communicate over the network 126 with the other systems 128 according to defined a protocol. In some examples, the other systems 128 can be representative of aircraft avionic systems, for example, as described herein.

In further examples, the other systems 128 can be representative of other components and interfaces. Examples of such other resources can include, but not limited to, a data path acceleration architecture incorporating acceleration for various functions (e.g., such as packet parsing, classification, and distribution, queue management for scheduling, packet sequencing, and congestion management, hardware buffer management for buffer allocation and de-allocation, encryption, regular expression pattern matching, etc.), ETHERNET interfaces (e.g., such as 10 GBps Ethernet (XAUI) controllers and 1 GBps Ethernet (SGMII) controllers), high-speed peripheral interfaces (e.g., such as PCI Express v2.0 controllers/ports and serial RapidIO 1.2 controllers/ports), additional peripheral interfaces (e.g., such as Universal Serial Bus (USB) controllers, Secure Digital (SD)/MultiMediaCard (MMC) controllers, Serial Peripheral Interface (SPI) controller, Inter-Integrated Circuit (I2C) controllers, dual universal asynchronous receiver/transmitters (DU-ARTs), enhanced local bus controller (eLBC)), multicore programmable interrupt controller (PIC), and direct memory access (DMA) engines.

Figure 2:
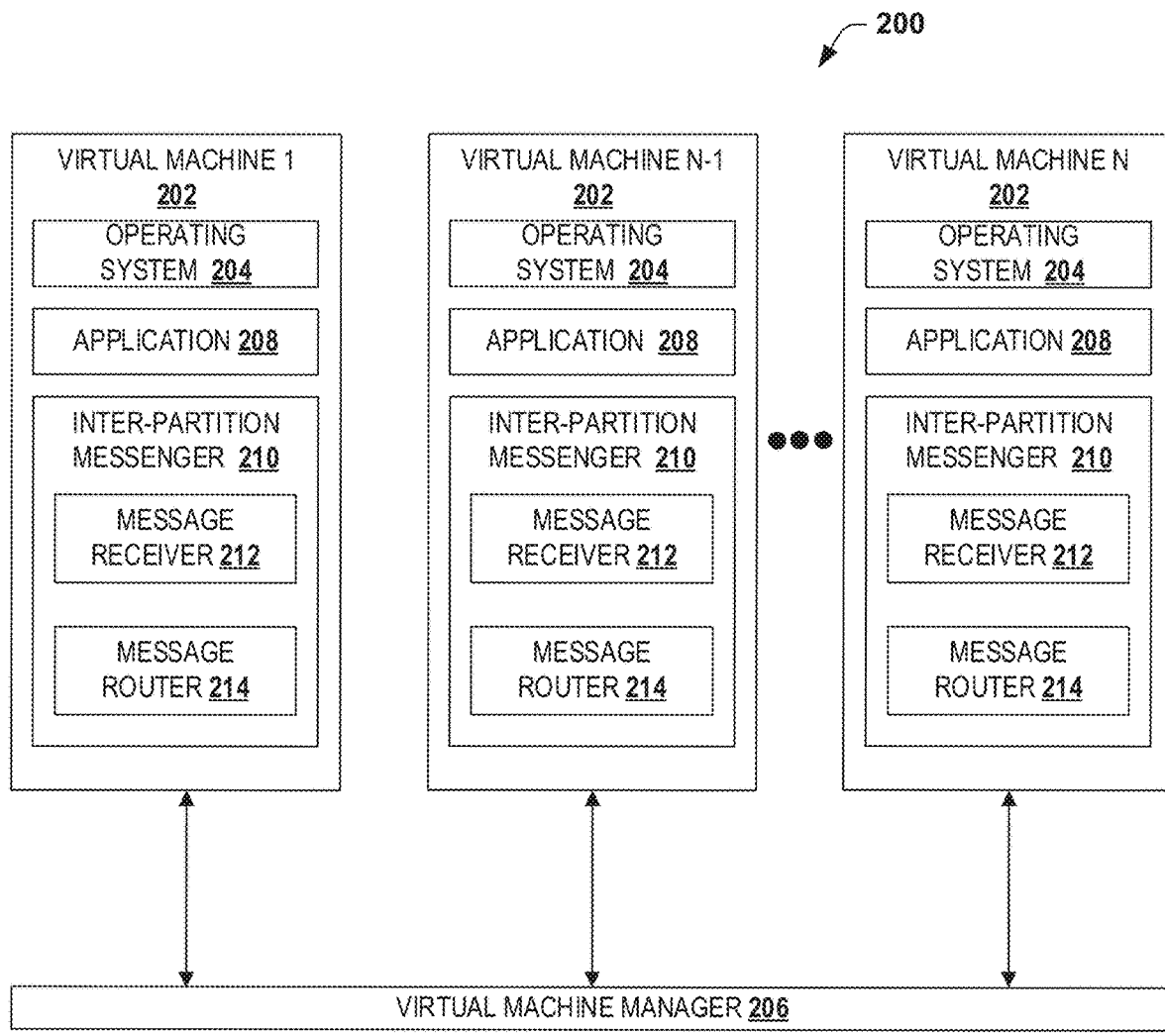
FIG. 2 illustrates an example of a logically partitioned platform according to the multi-partition architecture system of FIG. 1.
Figure 3:
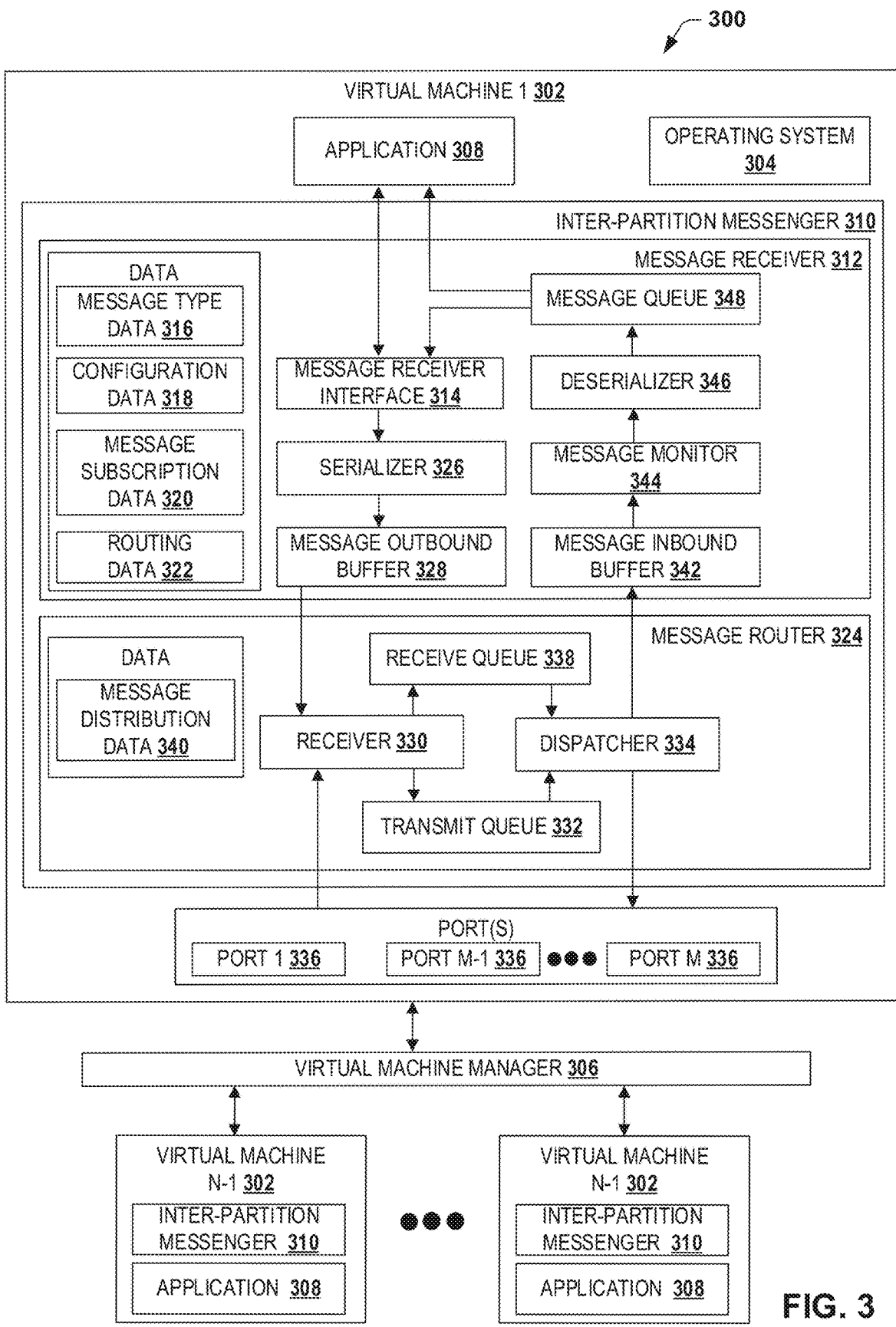
FIG. 3 illustrates another example of a logically partitioned platform according to the multi-partition architecture system of FIG. 1.

In the example of FIG. 1, the multi-core processor unit 102 can be configured so that each core 104 executes the sequence of instructions representative of a corresponding partition software 120 stored in the storage medium 110 at any given time. There can be a dedicated portion in the local memory 108 that can be used by the corresponding partition software 120 executing in a respective partition space. In this regard, there can be multiple logical partition spaces in the system 100 each representing a "virtual machine" that can execute partition software 120, e.g., as illustrated in FIGS. 2-3.

Upon execution of each partition software 120 (e.g., by one or more cores 104), each virtual machine can provide a software environment for instantiating one or more applications (not shown in FIG. 1) and a corresponding inter-partition messenger 122. Each inter-partition messenger 122 can reside on a similar virtual machine as the one or more applications and can be programmed to receive and transmit one or more messages to one or more other applications residing locally (e.g., on the same virtual machine) and/or on one or more other applications residing on a different virtual machine(s). For example, the inter-partition messenger 122 on a first virtual machine can be programmed to receive a message from a given application on the first virtual machine for one or more other applications that can be local to the given application or located on a different virtual machine(s). The inter-partition messenger 122 on the first virtual machine can be programmed to identify a message type for the message based on message type data local to the first virtual machine. The message type data can specify (or identify) a particular message type (e.g., a topic) for a respective application. Thus, the inter-partition messenger 122 on the first virtual machine can be programmed to tag (e.g., associate) each message provided by an associated application with a corresponding message type.

In response to identifying a proper message type for the message based on the message type data local to the first virtual machine, the inter-partition messenger 122 on the first virtual machine can be programmed to identify one or more applications that have been registered (e.g., subscribed) to receive the message based on message subscription data local to the first virtual machine. The message subscription data local to a given virtual machine can specify (or identify) one or more applications located within a similar partition space (e.g., on a same virtual machine) as a message originating application and/or one or more applications located within a different partition space(s) (e.g., on one or more other virtual machines) that has been registered to receive a particular message generated by the message originating application. In some examples, in response to identifying the one or more applications that is to receive the message, and the one or more applications is within a similar partition space (e.g., on the same virtual machine) as the given application, the inter-partition messenger 122 on the first virtual machine can be programmed to communicate the message to the one or more applications local to the given application. In some examples, the inter-partition messenger 122 on the first virtual machine can be programmed to make the message available for retrieval by the one or more local applications.

In additional or other examples, in response to identifying the one or more applications that is to receive the message and determining that the one or more applications is located within a different partition space (e.g., on a second virtual machine) as the given application, the inter-partition messenger 122 on the first virtual machine can be programmed to communicate with a virtual machine manager (VMM) (not shown in FIG. 1) to route the message to the second virtual machine based on routing data. In some examples, the inter-partition messenger 122 on the first virtual machine can append the routing data to the message as header data and communicate with the VMM to route the message to the second virtual machine that includes the one or more applications that is to receive the message. An inter-partition messenger 122 on the second virtual machine can be programmed to receive the message for the one or more applications local to the second virtual machine. The inter-partition messenger 122 on the second virtual machine can evaluate the header data appended to the message to identify the one or more applications on the second virtual machine 202 that is to receive the message.

In response to identifying the one or more applications on the second virtual machine that is to receive the message based on the header data, the inter-partition messenger 122 on the second virtual machine can strip (e.g., remove) the header data from the message and provide the message to each identified application that is to receive the message on the second virtual machine. In some examples, the inter-partition messenger 122 on the second virtual machine can strip the header data from the message prior to evaluating the header data to identify the one or more applications on the second virtual machine that is to receive the message.

In some examples, each identified application on the second virtual machine can be programmed to retrieve (e.g., periodically, at a given instance of time, etc.) the message from the inter-partition messenger 122 on the second virtual machine. For example, in response to identifying each registered application, the inter-partition messenger 122 on the second virtual machine can be programmed to make the message available for retrieval by each identified application. Each identified application can be programmed to retrieve a corresponding message from the inter-partition messenger 122 on the second virtual machine. Accordingly, the inter-partition messaging system can distribute application-generated messages to applications residing in a local partition space and/or in different partition spaces (e.g., non-local partition spaces). In some examples, the one or more applications residing on the second virtual machine can be programmed to employ the local inter-partition messenger 122 to communicate a message to one or more other local applications and/or one or more applications residing within another partition space (e.g., the first virtual machine) in a same or similar manner as described herein with respect the first virtual machine.

Accordingly, the system 100 can be configured to allow for inter-partition communication of messages between one or more applications residing in discrete partitioned systems. The system 100 permits for real-time communication of safety-critical information (e.g., messages) in a distributed publish-subscribe paradigm between multiple partitioned systems without the use of an external device while ensuring that software applications residing in each partition meet defined safety critical software standards.

FIG. 2 illustrates an example of a logically partitioned platform 200 based on the multi-architecture system 100, as illustrated in FIG. 1. Thus, reference may be made to the example of FIG. 1 in the following description of the example of FIG. 2. The logically partitioned platform 200 can include N number of virtual machines 202, wherein N is an integer greater than two. Each virtual machine 202 can include virtual computer devices that can be implemented in software to emulate corresponding components of a physical computing device, such as a physical computer, and thereby implement one or more functions of an inter-partition messaging system, as described herein. Thus, each virtual machine 202 can provide a software environment for implementing partition software, such as the partition software 120, as illustrated in FIG. 1. Accordingly, each virtual machine 202 can implement an operating system 204 based on associated partition software.

Each operating system 204 can be programmed to interface with a virtual machine manager (VMM) 206. The VMM 206 can be programmed to perform a number of functions and services for the virtual machines 202 to create and enforce the partitioning of the logically partitioned platform 200, including communication of application generated messages between partitioned spaces (e.g., virtual machines 202). In some examples, the VMM 206 can correspond to a hypervisor. The hypervisor can be compliant with an ARINC 653 standard. Additionally or alternatively, the VMM 206 can correspond to or form part of the partitioning kernel 116, as illustrated in FIG. 1. When each partition software 120 is implemented, the VMM 206 can provide (e.g., load) a copy of associated firmware into each partition space by a partition manager of the VMM 206. Processor cores (e.g., the cores 104, as illustrated in FIG. 1) associated or assigned to corresponding partition software can be dispatched to the partition's memory in local memory (e.g., the local memory 108, as illustrated in FIG. 1) to execute the partition firmware. Thus, the VMM 206 allows for simultaneous execution of independent operating system images (e.g., operating systems 204) by virtualizing all the hardware resources of the logically partitioned platform 200.

Upon execution of the operating system 204 on each virtual machine 202, each virtual machine 202 can provide can provide a software environment for instantiating each application 208 and inter-partition messenger 210 based on corresponding partition software (e.g., the partition software 120, as illustrated in FIG. 1). Each inter-partition messenger 210 can be implemented by a group of software routines or software libraries, such as static libraries that can collectively function to provide the inter-partition messenger functionalities, as described herein, and header files (e.g., application program interface (APIs)) for enabling the one or more applications 208 to interact (or interface) with the inter-partition messenger 208 for sending and receiving messages according to the examples described herein. Each inter-partition messenger 210 can be programmed to allow each associated application 208 on a given virtual machine 202 to receive and transmit one or more messages to one or more applications 208 on the given virtual machine 202 and/or on one or more other applications 208 residing on a different virtual machine(s) 202.

By way of example, a first application 208 on a first virtual machine 202 (labeled in FIG. 2 as "VIRTUAL MACHINE 1") in response to being instantiated (e.g., by the operating system 204) can be programmed to generate (e.g., publish) one or more messages (referred to herein as "message") for communication to one or more other applications 208 (referred to herein as "second application 208"). In some examples, the second application 208 can reside locally on the same virtual machine 202 as the first application 208. In additional or alternative examples, the second application 208 can reside on another virtual machine, such as a second virtual machine 202 (labeled in FIG. 2 as "VIRTUAL MACHINE N-1"). In some examples, the message can include safety-critical information associated with a system (e.g., navigation) under control by the first application 208 (e.g., by employing the network interface 124, as illustrated in FIG. 1). The message can also include priority information specifying a degree of priority for the message (e.g., low, medium, and high priority). The first application 208 can be programmed to communicate the message to the first inter-partition messenger 210 on the first virtual machine 202.

Each inter-partition messenger 210 on each virtual machine 202 can include a message receiver 212. Although FIG. 2 illustrates the message receiver 212 being separate from the first application 208, in some examples, the first application 208 can include the message receiver 212. The message receiver 212 can be associated (e.g., logically) with a given application 208 residing locally on the virtual machine 202. Accordingly, each application 208 can be programmed to interface with a respective message receiver 212 executing locally. Each message receiver 212 can be programmed to receive a message from an associated application 208. The message receiver 212 can be programmed to identify a message type for each message based on message type data local to the first virtual machine 202. In this regard, each message receiver 212 can be programmed to tag (e.g., associate) each message provided by an associated application 208 with a corresponding message type. The message type data can specify (or identify) a particular message type for a given application. The message type can correspond to a topic, which can denote a subject of the message. Example topics can include, but not limited to, a status topic, which can be representative of a state of a process for an associated application. Thus, a unique message type can be identified for each message or at least a portion of the messages provided by the one or more applications 208.

In some examples, each message receiver 212 can be programmed to receive the message type data based on a user input (e.g., received at a user-input device). For example, a message receiver 212 programmed for receiving a first message type (e.g., a status topic) can be provided with message type data identifying the first message type, such that the message receiver 212 can be configured for tagging messages from a respective application 208 with the first message type. In other examples, the message receiver 212 can be programmed to receive configuration data (e.g., an extensible markup language (XML) configuration file). The configuration data can include the message type, which in some examples can be provided based on the user input. Thus, the configuration data (or a portion thereof) can be generated based on the user input. Accordingly, each message receiver 212 can be programmed to receive a message generated by an associated application 208 in a local partition space (e.g., respective virtual machine 202) and identify a given message type (e.g., a unique topic) for the received message based on corresponding message type data associated with the local partition space.

In response to identifying the message type for the message based on the message type data, the message receiver 212 on the first virtual machine 202 can be programmed to identify the second application 208 that has been registered (e.g., subscribed) to receive the message based on message subscription data local to the first virtual machine 202. The message subscription data local to a given virtual machine can specify (or identify) one or more applications (e.g., the second application 208) located within a similar partition space (e.g., on the first virtual machine 202) as a message originating application (e.g., the first application 208) and/or one or more applications (e.g., the second application 208) located within a different partition space(s) (e.g., the second virtual machine 202) that has been registered to receive a message.

The message receiver 212 on the first virtual machine 202 can be programmed to identify the second application 208 subscribed for receiving the message by evaluating the message type identified for the message and the message subscription data local to the first virtual machine 202. For example, the message receiver 212 on the first virtual machine 202 can be programmed to evaluate the identified message type relative to a message subscription table associating a plurality of message types (e.g., topics) with corresponding application subscribers (e.g., one or more applications that is to receive the message).

In some examples, in response to identifying the second application 208 that is to receive the message, and the second application 208 is within a similar partition space (e.g., on the first virtual machine 202) as the first application 208, the message receiver 212 on the first virtual machine 202 can be programmed to communicate the message to the second application 208 on the first virtual machine 202. In some examples, the inter-partition messenger 210 on the first virtual machine 202 can be programmed to make the message available for retrieval by the second application 208 local to the first application 208. In additional or other examples, in response to identifying the second application 208 that is to receive the message and determining that the second application 208 is located within a different partition space (e.g., on the second virtual machine 202), the message receiver 212 on the first virtual machine 202 can be programmed to append routing data as header data to the message for the second application 208 for routing to the other partition space. In some examples, at least a portion of the header data can be generated by the message receiver 212 on the first virtual machine 202 based on the message type data and/or the message subscription data.

The header data can be employed by a message router 214 on an associated virtual machine 202 for routing of a given message to one or more other virtual machines 202 on which one or more applications 208 reside and that is to receive the given message. Each inter-partition messenger 210 can further include a message router 214. The message router 214 can be programmed to receive messages from local message receivers 212. The message router 214 can be programmed to evaluate the header data to identify at least one virtual machine 202 that is to receive the message. For example, the message router 214 on the first virtual machine 202 can identify the second virtual machine 202 that includes the second application 208 based on virtual machine destination information of the header data. In response to identifying the second virtual machine 202, the message router 214 on the first virtual machine 202 can communicate with the VMM 206 for routing of the message to the second virtual machine 202.

The message router 214 on the second virtual machine 202 can be programmed to receive the message and evaluate the message relative to message distribution data to identify an appropriate message receiver 212 for the message. For example, the message router 214 can be programmed to evaluate a message type identifier (ID) corresponding to (or representative of) the message type (e.g., the topic) for the message in the header data of the message relative to message distribution data local to the second virtual machine 202 to identify a local message receiver 212 that is to receive the message. The message distribution data can specify (or identify) a corresponding message receiver associated with a respective application on a virtual machine that is to receive a given message that has originated from an application on another virtual machine. Thus, the message distribution data can associate each message receiver with a corresponding message type ID, and the message router 214 can be programmed to compare the message type ID of the header data of the message relative to each message type ID in the message distribution data to identify the appropriate message receiver 212 for the message.

In response to identifying the appropriate message receiver 212 on the second virtual machine 202, the message router 214 can provide the message to the message receiver 212. The message receiver 212 on the second virtual machine 202 can strip (e.g., remove) the header data from the message and provide the message without the header data to the second application 208 on the second virtual machine 202. In some examples, the message receiver 212 on the second virtual machine 202 can store the message in a message queue (not shown in FIG. 2) after stripping the header data from the message. Each message receiver 212 can be associated with (or include) a message buffer and can store messages received for a corresponding application 208 in the message buffer. Each application 208 on each virtual machine 202 can be programmed to interface with a respective message receiver 212 and access (e.g., periodically, at a given instance of time, etc.) messages stored for an associated application 208 in the message buffer. Thus, message receiver 212 on the second virtual machine 202 can be programmed to make the message available for use (e.g., retrieval, processing, etc.) by the second application 208.

In some examples, the second application 208 can be programmed to employ the local inter-partition messenger 210 on the second virtual machine 202 to communicate a message to one or more applications 208 residing on the second virtual machine 202 and/or the first application 208 residing on the first virtual machine 202 in a same or similar manner as described herein with respect the first virtual machine 202. For example, the second application 208 on the second virtual machine 202 can be programmed to generate (e.g., publish) a message for the first application 208 on the first virtual machine 202. The message receiver 212 on the second virtual machine 202 can be programmed to receive the message for the first application 208. The message receiver 212 on the second virtual machine 202 can be programmed to identify a message type for the message for the first application 2028 based on message type data that is local to the second virtual machine 202.

In response to identifying the proper message type for the message for the first application 208 based on local message type data, the message receiver 212 on the second virtual machine 202 can be programmed to determine (or identify)

one or more applications 208 registered for receiving the message based on message subscription data local to the second virtual machine 202. In response to identifying that the first application 208 on the first virtual machine 202 is to receive the message based on the message type and local message subscription data, the message receiver 212 on the second virtual machine 202 can be programmed to append routing data to the message as header data for routing of the message to the first virtual machine 202 that includes the first application 208.

The message router 214 on the second virtual machine 202 can be programmed to receive the message for the first application 208. The message router 214 on the second virtual machine 202 can be programmed to evaluate the header data of the message to identify the first virtual machine 202 and communicate with the VMM 206 to route the message to the first virtual machine 202. The message router 214 on the first virtual machine 202 can be programmed to receive the message for the first application 208. The message router 214 on the first virtual machine 202 can evaluate the header data of the message for the first application 208 based on message distribution data that is local to the first virtual machine 202 to identify an appropriate message receiver 212 that is to receive the message. The message router 214 on the first virtual machine 202 can provide the received message for the first application 208 to the identified message receiver 212 on the first virtual machine 202.

The message receiver 212 on the first virtual machine 202 can strip the header data appended to the message for the first application 208 by the message receiver 212 on the second virtual machine 202, and provide the message to the first application 208 or make the message available for use (e.g., retrieval, processing, etc.) by the first application 208. In some examples, the message receiver 212 on the first virtual machine 202 can queue the message in a message buffer after stripping the header data from the message for the first application 208. The message receiver 212 on the first virtual machine 202 can be associated with (or include) a corresponding message buffer and store messages for the first application 208. The first application 208 can be programmed to interface with a corresponding message receiver 212 and access (e.g., periodically, at a given instance of time, etc.) messages stored for the first application 208 in the message buffer.

Accordingly, by utilizing the inter-partition messenger system applications residing in discrete partition spaces (e.g., on virtual machines 202) can communicate messages (e.g., critical safety application information) to one or more applications residing within a similar partition space (e.g., on the same virtual machine 202) and/or one or more applications residing on one or more different partition spaces (e.g., on different virtual machines 202). The inter-partition messaging system can distribute the message to all applications that have been registered (e.g., subscribed) to receive the message. The inter-partition messaging system can employ the inter-partition messenger 210 local to a message originating application (e.g., the first application 208) and distribute the message to all other applications (e.g., the second application 208) native to the message originating application or that reside in different partition spaces (e.g., on other virtual machines 202) that have been subscribed to receive the message.

FIG. 3 illustrates another example of a logically partitioned platform 300 based on the multi-partition architecture system according to FIG. 1. Thus, reference may be made to the example of FIG. 1 in the following description of the example of FIG. 3. In some examples, the logically partitioned platform 300 can correspond to the logically partitioned platform 200, as illustrated in FIG. 2. The logically partitioned platform 300 can include N number of virtual machines 302, wherein N is an integer greater than two. Each virtual machine 302 can include virtual computer devices that can be implemented in software to emulate corresponding components of a physical computing device, such as a physical computer, and thereby implement one or more functions of an inter-partition messaging system, as described herein. Thus, each virtual machine 302 can provide a software environment for implementing partition software, such as the partition software 120, as illustrated in FIG. 1. Accordingly, each virtual machine 302 can implement an operating system 304 based on associated partition software.

Each operating system 304 can be programmed to interface with a virtual machine manager (VMM) 306. The VMM 306 can be programmed to perform a number of functions and services for the virtual machines 302 to create and enforce the partitioning of the logically partitioned platform 300, including communication of application generated messages between partitioned spaces (e.g., virtual machines 302). In some examples, the VMM 306 can correspond to a hypervisor. The hypervisor can be compliant with an ARINC 653 standard. Additionally or alternatively, the VMM 306 can correspond to or form part of the partitioning kernel 116, as illustrated in FIG. 1. When each partition software 120 is instantiated, the VMM 306 can provide (e.g., load) a copy of associated firmware into each partition space by a partition manager of the VMM 306. Processor cores (e.g., the cores 104, as illustrated in FIG. 1) associated or assigned to corresponding partition software can be dispatched to the partition's memory in local memory (e.g., the local memory 108, as illustrated in FIG. 1) to execute the partition firmware. Thus, the VMM 306 allows for simultaneous execution of independent operating system images (e.g., operating systems 304) by virtualizing all the hardware resources of logically partitioned platform 300.

Upon execution of the operating system 306 on each virtual machine 302, each virtual machine provides a software environment for instantiating each application 308 and inter-partition messenger 310 based on corresponding partition software (e.g., the partition software 120, as illustrated in FIG. 1). The inter-partition messenger 310 can correspond to the inter-partition messenger 122, as illustrated in FIG. 1. Each inter-partition messenger 310 can be implemented with a group of software routines or software libraries, such as static libraries that can collectively function to provide the inter-partition messenger functionalities, as described herein, and header files (e.g., application program interface (APIs)) for enabling the one or more applications 308 to interact (or interface) with the inter-partition messenger 308 for sending and receiving messages according to the examples described herein. Each inter-partition messenger 310 can be programmed to allow each associated application 308 on a given virtual machine 302 to receive and transmit one or more messages to one or more applications 308 on the given virtual machine 302 and/or on one or more other applications 308 residing on a different virtual machine(s) 302.

By way of example, a first application 308 on a first virtual machine 302 (labeled in FIG. 3 as "VIRTUAL MACHINE 1") in response to being instantiated can be programmed to generate (e.g., publish) a message for communication to a second application 308. In some examples, the second application 308 can reside locally on the same virtual machine 302 as the first application 308. In additional or alternative examples, the second application 308 can reside on another virtual machine, such as a second virtual machine 302 (labeled in FIG. 3 as "VIRTUAL MACHINE N-1"). In some examples, the message can include safety-critical information associated with a system (e.g., navigation) under control by the first application 308. The message can also include priority information specifying a degree of priority for the message (e.g., low, medium, and high priority). The first application 308 can be programmed to communicate the message to the first inter-partition messenger 310 on the first virtual machine 302.

Each inter-partition messenger 310 on each virtual machine 302 can include a message receiver 312. Each message receiver 312 can be associated (e.g., logically) with a corresponding application 308 residing locally on the virtual machine 302. Accordingly, each application 308 can be programmed to interface with a respective message receiver 312 executing locally. Each message receiver 312 can include a message receiver interface 314. The message receiver interface 314 can be programmed to provide an interface for (or to) an associated application 308. The message receiver interface 314 can be programmed to receive a message generated by the first application 308 residing locally on the virtual machine 302.

Each message receiver interface 314 can be programmed to identify a message type for each message based on message type data 316 local to the first virtual machine 302. In this regard, each message receiver interface 314 can be programmed to tag (e.g., associate) each message provided by an associated application 308 with a corresponding message type. The message type data can specify (or identify) a particular message type for a given application (e.g., the first application 308). The message type can correspond to a topic, which can denote a subject of the message. Example topics can include, but not limited to, a status topic, which can be representative of a state of a process for an associated application. Thus, a unique message type can be identified for each message or at least a portion of messages provided by the one or more applications 308 on an associated virtual machine 302.

In some examples, each message receiver interface 314 can be programmed to receive the message type data 316 based on user input (e.g., received at a user-input device). For example, a message receiver interface 314 programmed for receiving a first message type (e.g., a status topic) can be provided with message type data 316 that identifies the first message type, such that the message receiver interface 314 can be configured for tagging messages from a respective application 308 with the first message type. In other examples, the message receiver interface 314 can be programmed to receive configuration data 318 (e.g., an extensible markup language (XML) configuration file). The configuration data 318 can include the message type, which in some examples can be provided based on the user input. Thus, the configuration data 318 (or a portion thereof) can be generated based on the user input. Accordingly, each message receiver interface 314 can be programmed to identify a given message type (e.g., a unique topic) for the received message based on corresponding message type data 316 associated with the local partition space.

In response to identifying a proper message type for the message based on the message type data 316, the message receiver interface 314 on the first virtual machine 302 can be programmed to identify the second application 308 that has been registered (e.g., subscribed) to receive the message based on message subscription data 320 local to the first virtual machine 302. The message subscription data 320 local to a given virtual machine can specify (or identify) one or more applications (e.g., the second application 308) located within a similar partition space (e.g., on the first virtual machine 302) as a message originating application (e.g., the first application 308) and/or one or more applications located within different partition spaces (e.g., on one or more other virtual machines 302) that have been registered to receive a message generated by the message originating application. The message receiver interface 314 on the first virtual machine 302 can be programmed to identify the second application 308 that has been subscribed for receiving the message based on the message type identified for the message and the message subscription data 320 local to the first virtual machine 302. For example, the message receiver interface 314 on the first virtual machine 302 can be programmed to evaluate the identified message type relative to a message subscription table associating a plurality of message types (e.g., topics) with corresponding application subscribers (e.g., one or more applications that is to receive the message).

In some examples, in response to identifying the second application 308 that is to receive the message, and the second application 308 is within a similar partition space (e.g., the first virtual machine 302) as the first application 308, the message receiver interface 314 on the first virtual machine 302 can be programmed to communicate the message to the second application 308 on the first virtual machine 302. In some examples, the message receiver interface 314 on the first virtual machine 302 can be programmed to make the message available for use (e.g., retrieval, processing, etc.) by the second application 208 local to the first application 308. In additional or other examples, in response to identifying the second application 308 that is to receive the message and determining that the second application 308 is located within a different partition space (e.g., on the second virtual machine 302), the message receiver interface 314 on the first virtual machine 302 can be programmed to append routing data 322 as header data to the message for the second application 308. In some examples, at least a portion of the routing data 322 can be generated by the message receiver interface 314 based on the message type data 316 and/or the message subscription data 320 local to the first virtual machine 302.

The routing data 322 can be employed by a message router 324 on the associated virtual machine 302 for routing of a given message to one or more other virtual machines 302 that include the one or more applications 302 and that is to receive the message. The routing data 322 can include, but not limited to, one or more of: information identifying a source virtual machine (e.g., the first virtual machine 302) from which the message originated, information identifying one or more destination virtual machines (e.g., the second virtual machine 302) for the message, a message type identifier (ID) corresponding to (or representative of) the message type (e.g., the topic), a message receiver ID that unique identifies a message receiver (e.g., the message receiver 312) of the source virtual machine, a message index corresponding to a unique ID for the message, a bus ID representative of a port for communication of the message, block information identifying the message as the Nth block in a multipart message, wherein N is an integer greater than two, and cyclic redundancy check (CRC) information for ensuring data integrity for the message.

In response to appending the routing data 322 to the message as header data, the message receiver interface 314 can be programmed to provide the message to a serializer 326. The serializer 326 of each message receiver 312 can be programmed to serialize (e.g., structure) the message into a serialized message. In other examples, the serializer 326 can be programmed to serialize the message prior to appending the routing data 322. In either example, the serialized message can be a sequence of bits (e.g., 1's and 0's) that can be representative of the message and/or the routing data 322. Thus, the serializer 326 can be programmed to receive the message in a given format (e.g., a structure or an object) and convert the message to another format (e.g., a string of bytes (or words)) appropriate for use thereof by the second application 308. The serializer 326 can structure the message in an appropriate format for communication between partitioned systems (e.g., virtual machines 302).

Each message receiver 312 can include a message outbound buffer 328. The serializer 326 can be programmed to store the serialized message in the message outbound buffer 328. Each inter-partition messenger 310 can include a message router 324. The message router 324 can be programmed to receive the serialized message stored in the message outbound buffer 328. For example, a receiver 330 of the message router 324 can be programmed to retrieve (e.g., periodically, at a given instance of time, etc.) the stored serialized message from the message outbound buffer 328. In other examples, the receiver 330 can be programmed to receive the serialized message from the serializer 326. In either example, the receiver 330 can be programmed to store the serialized message in a transmit queue 332 for transmission (e.g., communication) to one or more other virtual machines 302.

The message router 324 of each inter-partition messenger 310 can include a dispatcher 334. The dispatcher 334 can be programmed to retrieve (e.g., periodically, at a given instance of time, etc.) the stored serialized message in the transmit queue 332. The dispatcher 334 can be programmed to evaluate the serialized message to identify at least one virtual machine 302 that is to receive the serialized message. For example, the dispatcher 334 of the first virtual machine 302 can identify that the second virtual machine 302 is to receive the serialized message based on the virtual machine destination information of the header data of the serialized message. Further, the dispatcher 334 can be programmed to evaluate the message data to identify one or more ports 336 of the first virtual machine 302 to employ for communication of the serialized message to the second virtual machine 302. Each of the virtual machines 302 can be linked by channels (e.g., ARINC 653 channels); a channel links a source (e.g., the first virtual machine 302) to one or more destinations (e.g., the second virtual machine 302).

Each of the virtual machines 302 can access the channels via defined access points corresponding to the one or more ports 336 (e.g., ARINC 653 ports). Thus, each of the virtual machines 302 can communicate with one or more other virtual machines 302 via M number of ports 336, where M is an integer greater than or equal to one. Accordingly, the one or more ports 336 can provide access to a communication connection (e.g., a channel) that one or more ports 336 of one or more other virtual machines 302 can access. In some examples, the VMM 306 can be programmed to implement and provide the one or more ports 336 and corresponding channels. In response to retrieving the serialized message from the transmit queue 332, the dispatcher 334 can be programmed to provide the serialized message to a first port 336 (labeled in FIG. 3 as "PORT 1") of the first virtual machine 302 and the VMM 306 can route the serialized message over a corresponding channel to the second virtual machine 302 for processing and communicating of the message to the second application 308 on the second virtual machine 302 in a same or similar manner as described herein with respect the first virtual machine 302.

The VMM 306 can route the serialized message between respective virtual machines 302 (e.g., the first and the second virtual machines 302) according to a defined protocol for the multi-partition architecture. In some examples, the dispatcher 334 can be programmed to evaluate the serialized message to identify a communication priority for the serialized message. In response to determining that the serialized message has a particular priority (e.g., high-priority), the dispatcher 334 can be programmed to provide the serialized over a port 336 assigned a similar priority (e.g., high-priority) for delivering of the serialized message over a corresponding channel to another virtual machine 302. For example, in response to determining that the serialized message has been assigned (or tagged) as high-priority, the dispatcher 334 can be programmed to provide the message to a port 336 associated with processing of high-priority messages.

In some examples, the second application 308 on the second virtual machine 302 can be programmed to employ the local inter-partition messenger 310 to communicate a message to one or more applications 308 residing on the second virtual machine 302 and/or the first application 308 residing on the first virtual machine 302 in a same or similar manner as described herein with respect the first virtual machine 302. For example, the second application 308 on the second virtual machine 302 can be programmed to generate (e.g., publish) a message for the first application 308 on the first virtual machine 302. The message receiver 312 on the second virtual machine 302 can be programmed to process the message for the first application 308 to provide a serialized message in a same or similar manner as described herein.

In response to retrieving the serialized message from the transmit queue 332 of the message router 324 on the second virtual machine 302, the dispatcher 334 of the message router 324 on the second virtual machine 302 can be programmed to provide the serialized message to the first port 336 on the second virtual machine 302. The VMM 306 can route the serialized message over the corresponding channel to the first virtual machine 302, and thus to the first port 336 of the first virtual machine 302. The receiver 330 of the message router 324 on the first virtual machine 302 can receive (or retrieve) the message from the first port 336 of the first virtual machine 302 and store the serialized message for the first application 308 in a receive queue 338 of the message router 324 on the first virtual machine 302. The dispatcher 334 of the message router 324 on the first virtual machine 302 can retrieve the serialized message for the first application 302 from the receive queue 338 and distribute the serialized message to the message receiver 312 on the first virtual machine 302 associated with the first application 308 that is to receive the message.

For example, the dispatcher 334 can evaluate the message data of the serialized message relative to message distribution data 340. The message distribution data 340 local to a given virtual machine can specify (or identify) an appropriate message receiver 312 that is to receive and thus provide a corresponding message to an associated application 308. The message distribution data 340 can including information identifying the message type ID (e.g., topic) for each message receiver 312. Thus, the message distribution data 340 can associate each message receiver with a corresponding message type ID. The dispatcher 334 can be programmed to analyze the message type ID corresponding to (or representative of) the message type (e.g., the topic) of the message data of the serialized message and the message distribution data 340 to identify the message receiver 312 that is to receive the serialized message.

The dispatcher 334 can be programmed to store the serialized message in a message inbound buffer 342 of the message receiver 312 identified to receive the serialized message. Each message receiver 312 can include a message monitor 344. The message monitor 344 can be programmed to monitor the message inbound buffer 342 for serialized messages. The message monitor 344 can be programmed to retrieve the serialized message stored by the dispatcher 334 in the message inbound buffer 342 and provide the serialized message to a deserializer 346 of the message receiver 312 on the first virtual machine 302. In some examples, the message monitor 344 can be programmed to strip the header data appended to the serialized message for the first application 308 prior to providing the serialized message to the deserializer 346. In other examples, the dispatcher 334 on the first virtual machine 302 can strip the header data of the serialized message for the first application 308, and store the serialized message without the header data in the message inbound buffer 342.

The deserializer 346 of each message receiver 312 can be programmed to deserialize the message into a deserialized message, and thereby recover the message. For example, the deserializer 346 can be programmed to receive the serialized message in a given format (e.g., a string of bytes (or words) and convert the message to another format (e.g., a structure or an object) appropriate for use thereof by the first application 308. The deserializer 346 can be programmed to store the deserialized message for the first application 308 in a message queue 348. The first application 308 can be programmed to access (e.g., periodically, at a given instance of time, etc.) the message stored in the message queue 348 and retrieve the message for use thereof. In some examples, the message receiver interface 314 can be programmed to retrieve the deserialized message in the message queue 348. The first application 308 can be programmed to communicate with the message receiver interface 314 to receive the retrieved deserialized message for use thereof.

Accordingly, by utilizing the inter-partition messenger system of the present disclosure, applications residing on discrete partition spaces (e.g., virtual machines 302) can communicate messages (e.g., critical safety application data) to one or more applications residing within a similar partition space (e.g., on the same virtual machine 302) and/or one or more applications residing on one or more different partition spaces (e.g., on different virtual machines 302). The inter-partition messaging system can distribute the message to all applications that have been registered (e.g., subscribed) to receive the message while adhering to a defined protocol, e.g., a message protocol that is defined by a particular standard (e.g., the ARINC 653 standard).

Figures 4, 5, 6:
FIG. 4 illustrates a logical representation of header data for routing of application messages between partitioned systems in a multi-partition architecture.
FIG. 5 illustrates an example of transport object code.
FIG. 6 illustrate an example of extensible markup language (XML) configuration code.

FIG. 4 illustrates a logical representation of header data for routing of application messages between partitioned systems in a multi-partition architecture, such as illustrated in FIG. 1. In some examples, the header data can be representative of all or a portion of the routing data as described herein (e.g., the routing data 322, as illustrated in FIG. 3). The header data can have a specified header bit length and a plurality of fields of fixed length (e.g., fixed bit lengths), including a topic identifier (ID) field, a message receiver ID field, a source partition (e.g., a source virtual machine) field, a message index field, a bus ID field, a destination partition (e.g., a destination virtual machine) field, a block ID field, and a cyclic redundancy check (CRC) field. The topic ID field can uniquely identify a topic (e.g., a message type) for a message provided by a respective application (e.g., the application 208, as illustrated in FIG. 2 or the application 308, as illustrated in FIG. 3) residing on a local virtual machine (e.g., the virtual machine 202, as illustrated in FIG. 2 or the virtual machine 302, as illustrated in FIG. 3), such that a message receiver (e.g., the message receiver 212, as illustrated in FIG. 2 or the message receiver 312, as illustrated in FIG. 3) on the destination virtual machine can reconstruct the message. The message receiver ID field can identify a message receiver associated with the software application residing on the virtual machine.

The source partition field can identify the virtual machine from which the message originated. The message index field can uniquely identify the message. The bus ID field can identify a given port (e.g., the one or more ports 336, as illustrated in FIG. 3) for transmitting the message. The destination partition field can identify a virtual machine that is to receive the message appended with the header data. The block ID field can identify the message appended with the header data as an Nth block, where N is an integer greater than one, in a multi-part message. The message receiver can be programmed to split messages of a given size and allow for tracking of the split message based on the block ID field. The CRC field can be employed to ensure data integrity for the message.

FIG. 5 illustrates an example of transport object code 500. The transport object code 500 can be template based on a message type (e.g., topic) and can be representative of at least a part of a message receiver (e.g., the message receiver 212, as illustrated in FIG. 2 or the message receiver 312, as illustrated in FIG. 3), as described herein. The transport object code 500 can be instantiated by application code (e.g., the application 208, as illustrated in FIG. 2 or the application 308, as illustrated in FIG. 3), for example during runtime of the software application code. In response to instantiating the transport object code 500, the application code can be enabled for communicating messages to one or more applications residing locally or in a different partition space, as described herein.

FIG. 6 illustrate an example of extensible markup language (XML) configuration code 600. In some examples, the XML configuration code 600 can be generated based on user input (e.g., at a user input device such as a keyboard). The XML configuration code 600 can specify a given message type (e.g., a topic), a port for communication of a message, and whether the message is to be distributed to all partitioned systems or a subset of partitioned systems (e.g., virtual machines, such as the virtual machines 202, as illustrated in FIG. 2 or the virtual machines 302, as illustrated in FIG. 3).

FIG. 7 illustrates an example of application program interface (API) code 700. The API code 700 can be representative of at least a part of a message router (e.g., the message router 214, as illustrated in FIG. 2 or the message router 324, as illustrated in FIG. 3), as described herein. The API code 700 can be employed for implementing one or more functions and/or routines of the message router, as described herein.

In view of the foregoing structural and functional features described above, example methods will be better appreciated with references to FIGS. 8-11. While, for purposes of simplicity of explanation, the example methods of FIGS. 8-11 are shown and described as executing serially, it is to be understood and appreciated that the example method is not limited by the illustrated order, as some actions could in other examples occur in different orders, multiple times and/or concurrently from that shown and described herein.

Figure 8:
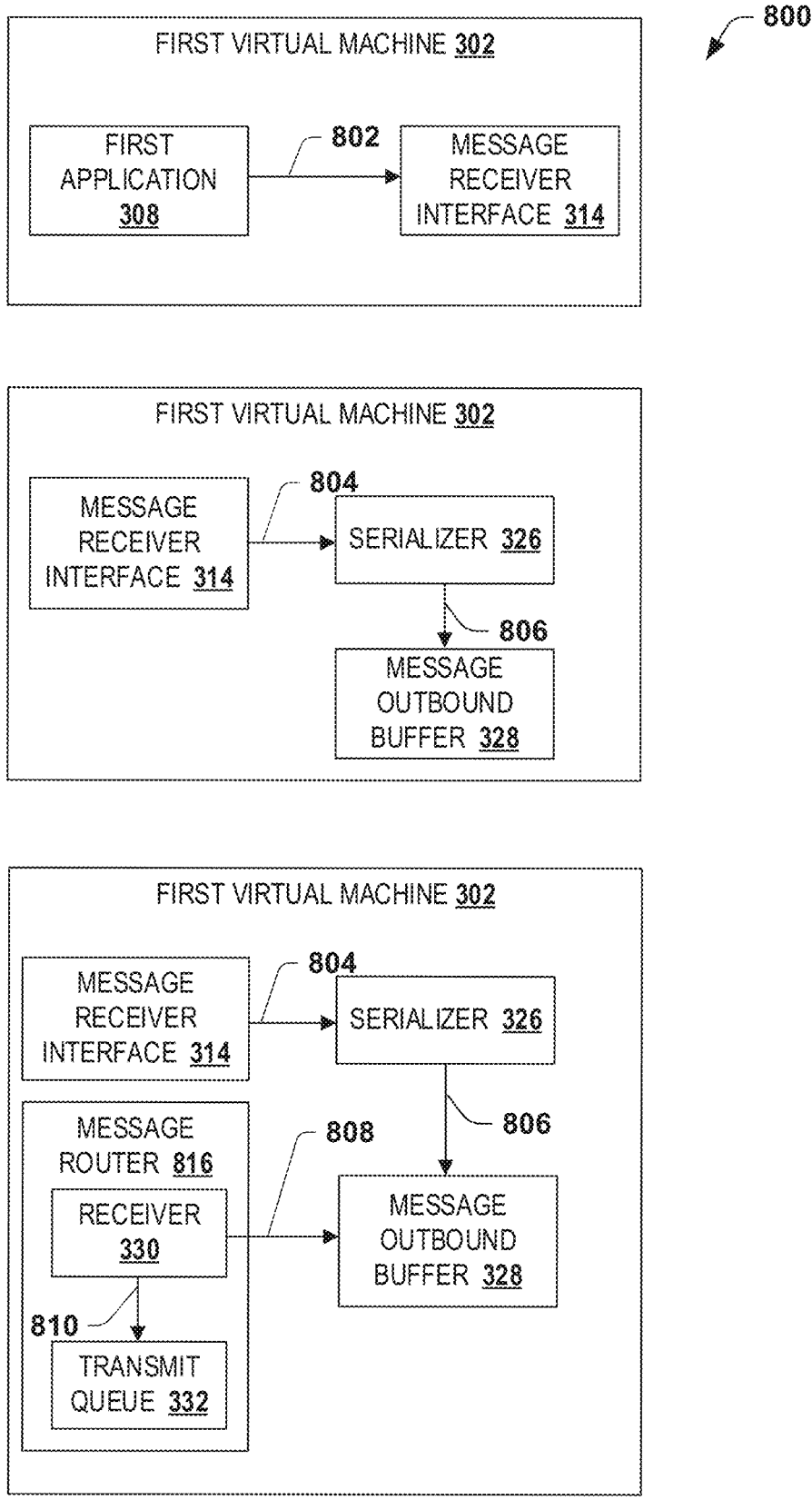
FIGS. 8-10 illustrate an example of a method for communicating application messages between partitioned systems in a multi-partition architecture.
Figure 9:
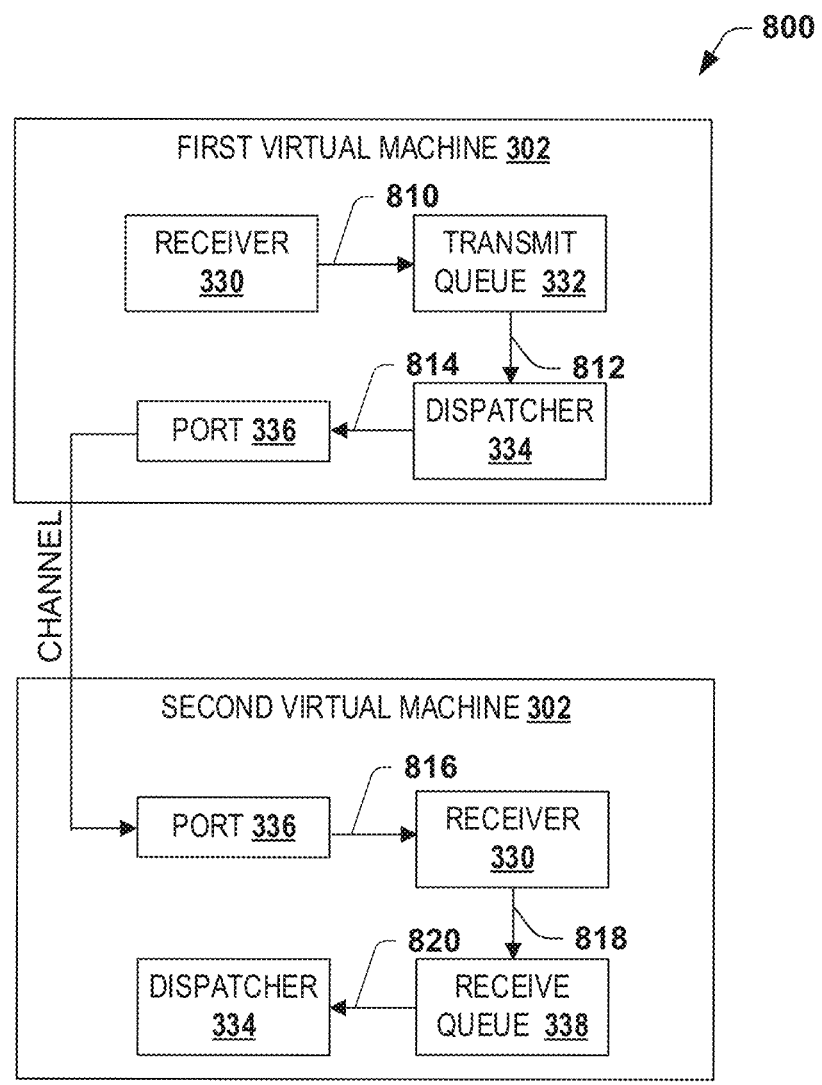
Figure 10:
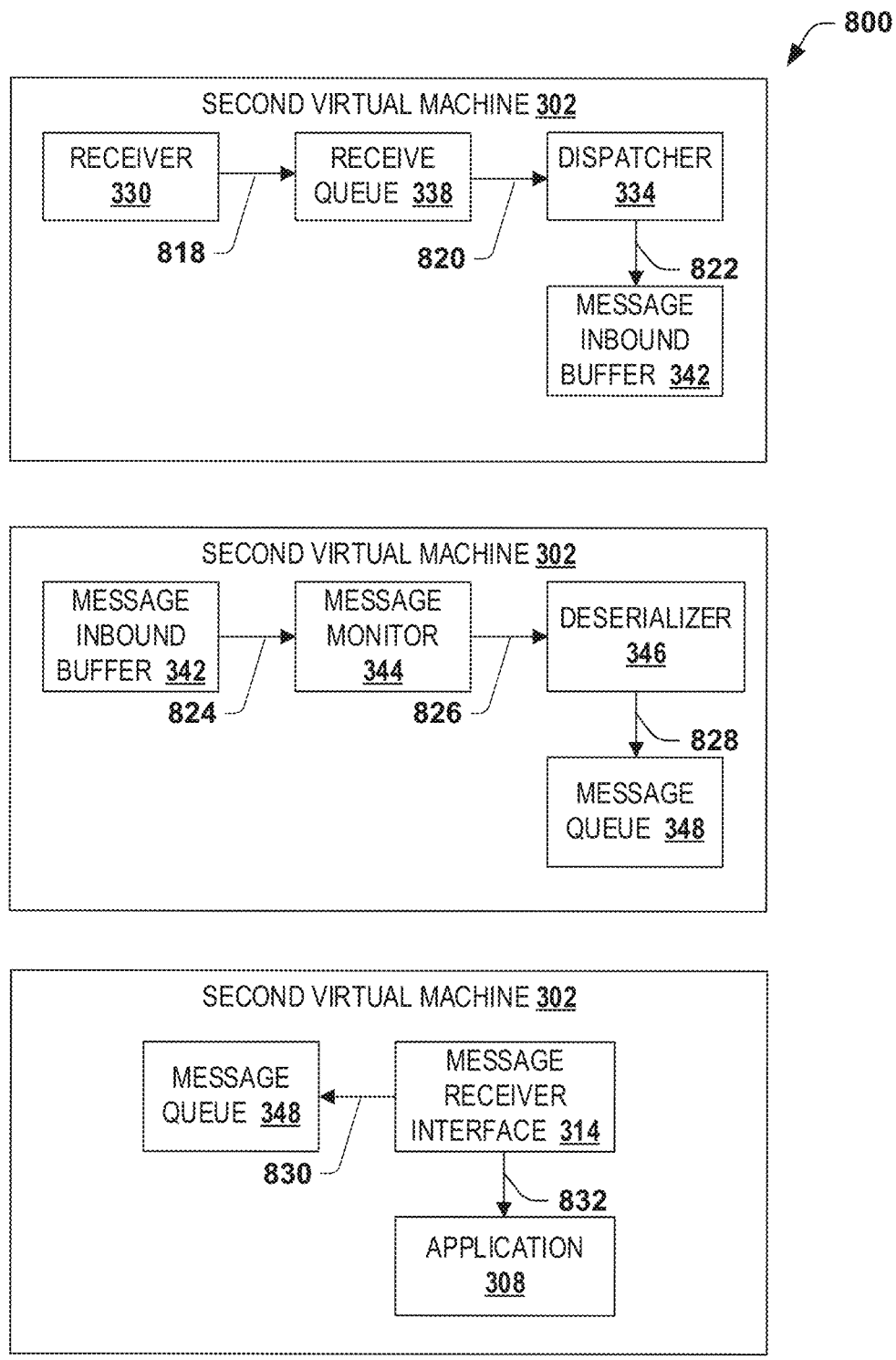

FIGS. 8-10 illustrates an example of a method 800 for communicating application messages between partitioned systems in a multi-partition architecture. The method 800 can be implemented, for example, by the system 100, as illustrated in FIG. 1. Thus, reference may be made to the example of FIGS. 1, 2 and/or 3 in the following description of the example method 800 of FIGS. 8-10. At 802, the first application 308 on the first virtual machine 302 upon being instantiated can be programmed to generate (e.g., publish) a message that is to be communicated to the second application 308 on the second virtual machine 302. The message receiver interface 314 can be programmed to receive the message generated by the first application 308. In other examples, at 802, the first application 308 can be programmed to provide the message to the message receiver interface 314. In some examples, at 802, the message receiver interface 314 can be programmed to identify the message type for the message based on corresponding message type data 316 and identify the second application 308 that has been registered (e.g., subscribed) for receiving the message based on the message subscription data 320. In some examples, at 802, the message receiver interface 314 can be programmed to append the routing data 322 as header data to the message for the second application 308.

At 804, the message receiver interface 314 can be programmed to provide the message to the serializer 326. The serializer 326 can be programmed to serialize (e.g., structure) the appended message into a serialized message. At 806, the serializer 326 can be programmed to store the serialized message in the message outbound buffer 328 in response to serializing the appended message. At 808, the receiver 330 of the message router 324 can be programmed to retrieve (e.g., periodically, at a given instance of time, etc.) or receive the stored serialized message at the message outbound buffer 328. At 810, the receiver 330 can be programmed to store the serialized message in the transmit queue 332 for transmission (e.g., communication) to the second virtual machine 302 that includes the second application 308. At 812, as illustrated in FIG. 9, the dispatcher 334 can be programmed to retrieve (e.g., periodically, at a given instance of time, etc.) the stored serialized message in the transmit queue 332. In some examples, at 812, the dispatcher 334 can be programmed to evaluate the serialized message to identify the second virtual machine 302 that is to receive the serialized message. In some examples, at 812, the dispatcher 334 can be programmed to evaluate the header data of the serialized message to identify the first port 336 of the first virtual machine 302 to employ for communication of the serialized message to the second virtual machine 302.

At 814, the dispatcher 334 can be programmed to provide the serialized message to the first port 336. In response to the first port 336 receiving the serialized message, the VMM 306 can route the serialized message over a corresponding channel (labeled in FIG. 9 as "CHANNEL") to the second virtual machine 302 for processing and communicating of the message to the second application 308 on the second virtual machine 302. The first port 336 of the second virtual machine 302 can be programmed to receive the serialized message. At 816, the receiver 330 on the second virtual machine 302 can receive (or retrieve) the serialized message from the first port 336. At 818, the receiver 330 can store the serialized message for the second application 308 in the receive queue 338 on the second virtual machine 302. At 820, the dispatcher 334 of the message router 324 on the second virtual machine 302 can retrieve the serialized message for the second application 302 from the receive queue 338.

At 822, as illustrated in FIG. 10, the dispatcher 334 can be programmed to store the serialized message in the message inbound buffer 342 of the message receiver 312 identified to receive the serialized message. At 824, the message monitor 344 can be programmed to retrieve the serialized message stored in the message inbound buffer 342 on the second virtual machine 302. At 826, the message monitor 344 can be programmed to provide the serialized message to the deserializer 346 of the message receiver 312 on the second virtual machine 302. In some examples, at 826, the message monitor 344 can be programmed to strip the header data appended to the serialized message for the second application 308 prior to providing the serialized message to the deserializer 346. In other examples, the dispatcher 334 on the second virtual machine 302 can strip the header data appended to the serialized message for the second application 308.

At 828, the deserializer 346 on the second virtual machine 302 can be programmed to deserialize the appended message into a deserialized message, and thereby recover the message, and store the deserialized message in the message queue 348 on the second virtual machine 302. At 830, in some examples, the message receiver interface 314 can be programmed to retrieve the deserialized message in the message queue 348. At 832, the second application 308 can be programmed to communicate with the message receiver interface 314 to receive the retrieved deserialized message for use thereof.

Figure 11:
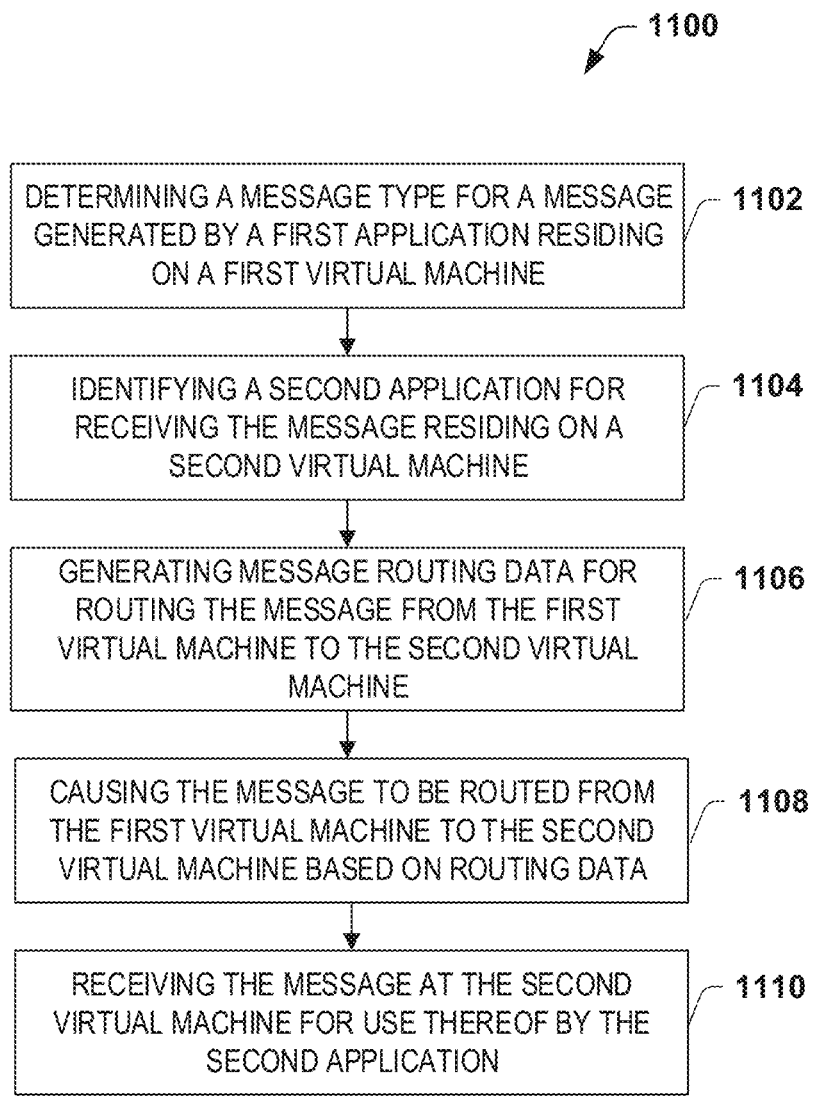
FIG. 11 illustrates an example of another method for communicating application messages between partitioned systems in a multi-partition architecture.

FIG. 11 illustrates an example of another method 1100 for communicating application messages between inter-partitioned operating systems. The method 1100 can be implemented, for example, by the system 100, as illustrated in FIG. 1. Thus, reference may be made to the example of FIGS. 1, 2 and/or 3 in the following description of the example of the method 1100 of FIG. 11. At 1102, a first inter-partition messenger (e.g., the inter-partition messenger 122, as illustrated in FIG. 1, the inter-partition messenger 210, as illustrated in FIG. 2 or the inter-partition messenger 310, as illustrated in FIG. 3), can be programmed to determine a message type for a message generated by a first application (e.g., the application 208, as illustrated in FIG. 2 or the application 308, as illustrated in FIG. 3) based on message type data (e.g., the message type data 316, as illustrated in FIG. 3). The first inter-partition messenger and the first application can reside on a first virtual machine (e.g., the virtual machine 202, as illustrated in FIG. 2 or the virtual machine 302, as illustrated in FIG. 3).

At 1104, the first inter-partition messenger can be programmed to identify a second application (e.g., the application 208, as illustrated in FIG. 2 or the application 308, as illustrated in FIG. 3) that resides on a second virtual machine (e.g., the virtual machine 202, as illustrated in FIG. 2 or the virtual machine 302, as illustrated in FIG. 3) that is to receive the message based on the identified message type and message subscription data (e.g., the message subscription data 320, as illustrated in FIG. 3). At 1106, the first inter-partition messenger can be programmed to generate message routing data (e.g., the routing data 322, as illustrated in FIG. 3), which can be used for routing of the message from the first virtual machine to the second virtual machine in response to identifying the second application. At 1108, the first inter-partition messenger can be programmed to cause the message to be routed from the first virtual machine to the second virtual machine based on message routing data. At 1110, a second inter-partition messenger (e.g., the inter-partition messenger 122, as illustrated in FIG. 1, the inter-partition messenger 210, as illustrated in FIG. 2 or the inter-partition messenger 310, as illustrated in FIG. 3) can be programmed to receive the message for use thereof by the second application. The second inter-partition messenger can reside on the second virtual machine.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
    determining, by one or more hardware processors, at a first inter-partition messenger, a message type for a message generated by a first application based on message type data, wherein the first inter-partition messenger and the first application reside on a first virtual machine;
    associating, by the one or more hardware processors, at the first inter-partition messenger, the message generated by the first application with the message type for routing of the message to a second application residing on a second virtual machine;
    evaluating, by the one or more hardware processors, at the first inter-partition messenger, the message type for the message and message subscription data to identify the second application; and
    causing, by the one or more hardware processors, the message to be routed from the first virtual machine to the second virtual machine for use thereof.

2. The method of claim 1, the method further comprising generating, by the one or more hardware processors, at the first inter-partition messenger, message routing data for routing of the message from the first virtual machine to the second virtual machine in response to identifying the second application.

3. The method of claim 2, further comprising appending, by the one or more hardware processors, at the first inter-partition messenger, the message routing data to the message as header data prior to the causing the message being routed from the first virtual machine to the second virtual machine.

4. The method of claim 3, further comprising generating, by the one or more hardware processors, at the first inter-partition messenger, the message routing data based at least on the message type and/or the message subscription data, wherein the message subscription data identifies the second application as a subscriber of the message generated by the first application.

5. The method of claim 3, wherein the header data comprises one of: information identifying the second virtual machine, a message type identifier (ID) representative of the message type, a bus ID representative of a port for communication of the message between the first virtual machine and the second virtual machine, and a combination thereof.

6. The method of claim 5, further comprising serializing, by the one or more hardware processors, at the first inter-partition messenger, the message to provide a serialized message.

7. The method of claim 6, further comprising identifying, by the one or more hardware processors, at the first inter-partition messenger, a given port of a plurality of ports associated with the first virtual machine and providing, by the one or more hardware processors, at the first inter-partition messenger, the serialized message to the given port.

8. The method of claim 7, wherein the given port of the plurality of ports associated with the first virtual machine provides access to a channel linking the first virtual machine with the second virtual machine, and wherein a virtual machine manager (VMM) is programmed to communicate the serialized message over the channel in response to the first inter-partition messenger providing the serialized message to the given port associated with the first virtual machine.

9. The method of claim 7, wherein the VMM is programmed to provide the serialized message to a given port of a plurality of ports associated with the second virtual machine, and wherein the receiving comprising accessing, by the one or more hardware processors, at the second inter-partition messenger, the given port associated with the second virtual machine to retrieve the serialized message.

10. The method of claim 9, further comprising deserializing, by the one or more hardware processors, at the second inter-partition messenger, the serialized message to recover the message.

11. The method of claim 10, further comprising storing, by the one or more hardware processors, at the second inter-partition messenger, the message in a message queue, wherein the second application is programmed to access the message queue to retrieve the message for use thereof.

12. A system comprising:
    memory to store machine readable instructions; and
    one or more hardware processors to access the memory and execute the machine readable instructions, the machine readable instructions causing the one or more hardware processors to provide a plurality of virtual machines, wherein a given virtual machine of the plurality of virtual machines comprises:
        an inter-partition messenger comprising:
            a message receiver programmed to:
                determine a message type for a message generated by a given
                application residing on the given virtual machine;
                    identify another application residing on another virtual machine of the plurality of virtual machines based on the message type for the message and message subscription data; and
            a message router programmed to provide the message to a virtual machine manager (VMM) for routing of the message to the other virtual machine for the other application.

13. The system of claim 12, wherein the message receiver is further programmed to generate routing data for routing of the message from the given virtual machine to the other virtual machine based at least on the message type and/or the message subscription data, the routing data being appended to the message as header data.

14. The system of claim 12, wherein the inter-partition messenger is a first inter-partition messenger, the message receiver is a first message receiver, and the message router is a first message router, the other virtual machine comprising:

a second inter-partition messenger comprising:
  a second message router programmed to receive the message; and
  a second message receiver programmed to store the message in a message queue, wherein the other application is programmed to access the message queue to retrieve the message for use thereof.

15. The system of claim 14, wherein the message is a serialized message, and wherein the second message receiver is further programmed to deserialize the serialized message to recover the message.

16. The system of claim 15, wherein one of the second message router and the second message receiver is further programmed to prior to deserializing the message strip header data appended to the message from the serialized message.

17. The system of claim 14, wherein the second message router is further programmed to evaluate header data appended to the message of the message relative to message distribution data to identify the second message receiver and provide the message to the second message receiver in response to identifying the second message receiver.

18. The system of claim 12, wherein the message receiver is further programmed to serialize the message to generate a serialized message, wherein the serialized message corresponds to a sequence of bits representative of the message, the serialized message being stored in a message outbound buffer for retrieval by the message router.

19. The system of claim 18, wherein the message router is programmed to identify a given port of a plurality of ports associated with the given virtual machine and provide the serialized message to the given port for routing by the VMM to the second virtual machine.

20. The system of claim 12, wherein the virtual machine manager is a hypervisor, the hypervisor being compliant with an Aeronautical Radio Inc. (ARINC) 653 standard.

\* \* \* \* \*